United States Patent [19]

Ryle et al.

[11] Patent Number: 5,308,693

[45] Date of Patent: May 3, 1994

[54] UNSTRETCHED SYNTHETIC PAPERS AND METHODS OF PRODUCING SAME

[75] Inventors: Thomas R. Ryle, Burlington, Ky.; Pai-Chuan Wu, Cincinnati, Ohio; Leopoldo V. Cancio, Cincinnati, Ohio; Girish K. Sharma, Cincinnati, Ohio

[73] Assignee: Clopay Plastic Products Company, Inc., Cincinnati, Ohio

[21] Appl. No.: 543,690

[22] Filed: Jun. 26, 1990

[51] Int. Cl.⁵ ............................................. B32B 3/06
[52] U.S. Cl. .............................. 428/307.3; 428/307.7; 428/315.5; 428/323; 428/330; 428/331; 428/537.5
[58] Field of Search .................. 428/323, 311.1, 312.2, 428/330, 331, 537.5, 307.3, 307.7, 315.5, 325, 913

[56] References Cited

U.S. PATENT DOCUMENTS

| | | | |
|---|---|---|---|
| 3,765,999 | 10/1973 | Toyoda | 161/170 |
| 3,841,903 | 10/1974 | Huang | 428/341 |
| 3,922,427 | 11/1975 | Toyoda et al. | 428/308 |
| 4,082,880 | 4/1978 | Zboril | 428/323 |

FOREIGN PATENT DOCUMENTS

| | | |
|---|---|---|
| 0758151 | 5/1967 | Canada . |
| 2-55185 | 8/1988 | Japan ........................ 428/313.5 |
| 8908023 | 9/1989 | PCT Int'l Appl. . |

Primary Examiner—Paul J. Thibodeau
Assistant Examiner—H. Thi Lê
Attorney, Agent, or Firm—Wood, Herron & Evans

[57] ABSTRACT

Novel, unstretched synthetic papers being virtually free of mechanically produced microvoids and having a porous surface for writing and printing thereon are disclosed. The unstretched synthetic papers of the instant invention are formed typically by extruding from pellets a film or sheet material formed with a continuous olefin resin matrix containing an effective amount of a particulate filler having pre-existing microvoids inherent thereto, such as a diatamaceous earth. The microvoid particulate filler is dispersed somewhat uniformly yet randomly throughout the continuous olefin resin matrix of the unstretched synthetic papers to provide non-mechanically produced microvoids in communication with the surfaces of the unstretched synthetic papers to render said surfaces porous for imparting writeability and printability thereto. Additional paper-like characteristics can be imparted to the novel, unstretched synthetic papers of the instant invention by the addition of other resins, such as a styrene resin, to the continuous olefin resin matrix. The novel, unstretched synthetic papers of the present invention have good receptivity and retentivity for common writing materials, such as ink, pencil lead, paint and the like, even though they are not mechanically stretched to form mechanically produced microvoids.

20 Claims, 1 Drawing Sheet

UNSTRETCHED SYNTHETIC PAPERS AND METHODS OF PRODUCING SAME

FIELD OF THE INVENTION

The present invention relates to an unstretched synthetic paper-like film which is virtually free of mechanically produced microvoids and formed with a continuous olefin resin matrix containing a particulate filler having pre-existing microvoids provided therewith for providing microvoids in communication with a surface of the synthetic paper-like film for imparting writeability and printability thereto. Unstretched synthetic papers of the instant invention are suitable for use as, for example, writing paper, envelopes, in-mold labels, pressure-sensitive labels, tape, bags, cups, wrappers, poster paper, cards, packaging paper, labels, greeting cards and the like.

BACKGROUND

Conventional writing paper is typically formed of a thin layer of interchangeable cellulosic fibers and is produced from raw materials such as wood, pulp, textile fibers, waste materials and waste paper. One major drawback associated with conventional writing paper is its low physical strength when wet. This is believed to be attributable to the abundance of hydroxyl groups in the cellulose which imparts pronounced wetability to the paper when exposed to, for example, water. In addition to this disadvantage, the cost of generating pulp for conventional writing paper has dramatically increased over the years.

In view of these drawbacks, numerous attempts have been made in the industry to produce paper substitutes from synthetic materials such as synthetic resins. Although various synthetic olefin resins, such as polyethylene and polypropylene, have been proposed as the bases for paper substitutes, the surfaces of such olefin resins are inherently hydrophobic and non-polar, resulting in poor or inadequate receptivity to common writing and printing materials such as inks, pencil leads, paint and the like. Attempts to improve the ink-receptivity of such olefin resins by the addition of polar fillers, for example, have been unsuccessful by reason of the fact that relatively small amounts of such fillers are believed to be ineffective since they remain totally encapsulated by the olefin resins and thus the surface of the sheets still present an overall homogeneous non-polar surface. Large amounts of such fillers, on the other hand, are believed to result in a deterioration of the desired physical properties, such as flexibility, tear resistance, tensile strength, etc., to the point where the filled olefin resins are no longer useful as paper substitutes.

In attempts to overcome these deficiencies, the industry has resorted to a variety of elaborate and complicated methods to produce synthetic papers. For example, U.S. Pat. No. 3,775,521 discloses a thermoplastic synthetic paper in the form of a cellular multi-layer film formed by biaxially stretching a thermoplastic sheet composed of an olefin resin, a styrene resin and an inorganic filler. U.S. Pat. No. 3,775,521 teaches that in order to impart writeability and printability, it is critical to mechanically treat the synthetic papers, i.e., to stretch the synthetic papers, to generate mechanically produced microvoids. For examples of other synthetic papers which rely upon mechanical processing, i.e., stretching, to produce microvoids to impart writeability and printability thereto, see U.S. Pat. Nos. 4,705,719, 4,359,497, 4,340,639, 4,318,950, 4,151,159, 4,097,645, 3,922,427, 3,903,234, 3,855,056, 3,841,943, 3,840,625, 3,790,435, 3,783,088, 3,551,194, 3,765,991, 3,758,661, 3,738,904, 3,551,538 and 2,971,858.

As an alternative to mechanically stretching the synthetic papers to produce microvoids, U.S. Pat. No. 3,840,625 discloses a method which relies upon elution and coagulation to deposit fine porous structures on the exterior surface to generate a paper-like film which can be used as a paper substitute. More particularly, U.S. Pat. No. 3,840,625 provides a process for producing a synthetic paper by first forming a film consisting essentially of an ethylene synthetic resin, a styrene resin and an inorganic filler, followed by dissolving the styrene resin with a first liquid and then precipitating the dissolved styrene resin with a second liquid to deposit the precipitated styrene resin onto the surface of the treated film. For other examples of synthetic papers which are formed by elution, see U.S. Pat. Nos. 3,855,056 and 3,551,538.

As another alternative method, U.S. Pat. No. 4,097,645 discloses a synthetic paper formed by coating a previously stretched olefin resin film containing a filler with an ethyleneimine adduct of a polyaminepolyamide for improving ink adhesion. For examples of other coated synthetic papers, see U.S. Pat. Nos. 4,705,719 and 4,340,639.

In yet another alternative method, U.S. Pat. No. 3,922,427 discloses a stretched synthetic paper-like film onto which an ethylenically unsaturated carboxylic acid, its anhydride, ester or amide has been graft copolymerized to produce a synthetic paper.

In still a further alternative method, U.S. Pat. No. 3,841,943 discloses a synthetic paper produced by laminating a paper-like film formed with a thermoplastic resin and an inorganic filler onto a previously stretched thermoplastic film, and then stretching the laminate.

In still a further alternative method, U.S. Pat. No. 3,553,302 discloses a synthetic paper produced by hydrating a sheet formed with a polyolefin resin containing gypsum, calcium sulfate hemihydrate and soluble anhydrite to impart printable properties to the film.

In addition to the above-described methods for producing synthetic papers, there are still other methods for obtaining synthetic papers. For example, a synthetic resin can be formed into staples or filaments which are interentangled and thus produced into a thin synthetic paper, as in the case of conventional pulp paper. Foamable styrene resins can be extruded into a thin sheet form to obtain a paper-like foam styrene resin film. Synthetic papers can also be obtained by flowing and spreading a solvent-dissolved synthetic resin onto a film to obtain a multi-cellular surface-roughened paper-like film. Still further, synthetic papers can be produced by coating the surface of a synthetic resin film with an inorganic or organic filler with the use of a binder or by embedding the same by means of heat and pressure. Alternatively, there are methods for obtaining synthetic papers by roughening the surface of synthetic resin films either by treating the surfaces with solvents or by treating them electrically, chemically and/or mechanically.

While paper-like thermoplastic synthetic resin films obtained by such known methods may possess certain favorable properties, such as water resistance, as compared with conventional paper made from pulp, their printability and paper-like properties are not only sometimes unsatisfactory, they may even change with the passage of time due to the complex manufacturing processes used to produce such paper-like films. Regardless, even if the paper-like films produced heretofore do not loose their favorable properties, they nevertheless are expensive to produce as a result of the complexities, additional components and additional processing steps associated with the manufacturing processes utilized hitherto to produce the synthetic paper substitutes.

Consequently, there is a demand in the industry for a synthetic paper substitute which has a wide range of utility and good paper-like characteristics including good receptivity and retentivity for writing materials, such as ink, pencil lead, paint and the like. Moreover, there is a demand in the industry for a synthetic paper substitute which can be manufactured simply and inexpensively.

SUMMARY OF THE INVENTION

In brief, the present invention alleviates the above-mentioned disadvantages and shortcomings of the present state of the art through the discovery of novel, unstretched synthetic papers for writing and printing thereon. Generally speaking, the unstretched synthetic papers of the instant invention, which are substantially free of mechanically produced microvoids, are formed with a continuous olefin resin matrix containing an effective amount of a particulate filler having pre-existing microvoids provided therein. The microvoid particulate filler is dispersed throughout the continuous olefin resin matrix of the synthetic papers of the instant invention to provide microvoids in communication with the surfaces of the synthetic papers for imparting thereto receptivity and retentivity for common writing and printing materials, such as ink, pencil lead, paint and the like.

The synthetic papers according to the present invention have excellent stiffness, tensile strength, and flexibility as are required for paper materials, they are generally uniform in thickness, and they have good tear resistance and writeable and printable properties. The synthetic papers of the instant invention, unlike those provided heretofore, rely upon the presence of microvoids inherent to and thus provided by the particulate filler located at their surfaces to impart the good writeable and printable characteristics thereto. These surprising characteristics are believed to occur since the microvoid particulate filler, which is integrally formed within the continuous olefin resin matrix, is dispersed somewhat uniformly but randomly therethroughout so that the non-mechanically produced microvoids are provided at the surfaces of the synthetic papers to render such surfaces porous for imparting writeability and printability thereto. Moreover, these surprising writeable and printable characteristics are amazingly accomplished even though the synthetic papers of the instant invention are not mechanically stretched to generate mechanically produced microvoids. Thus, it has now been discovered that the added step of mechanically stretching as required heretofore to impart writeability and printability is no longer necessary to produce a synthetic paper having good writeable and printable characteristics. In other words, the present invention has now made it possible to produce a synthetic paper having good writeability and printability without having to rely upon mechanically stretching the synthetic paper to generate mechanically produced microvoids to impart writeability and printability thereto.

A method for producing the synthetic papers according to the instant invention provides for admixing the constituents into, for example, a homogeneous blend in the form of a pellet and extruding the pellet into a continuous olefin resin matrix in the form of a film or sheet having a thickness of about 1 mil to about 10 mils or more for making the paper-like products. Generally speaking, the olefin resins which can be used include, for instance, polyethylene, polypropylene, copolymers and the like. The microvoid particulate fillers which are suitable for use include for example, diatamaceous earth, volcanic ash, silica gels, styrogels, porous glass beads or other such equivalents. The continuous olefin resin matrix may also include other additives for achieving desired properties. For example, the continuous olefin resin matrix of the synthetic papers of the instant invention may include a foldability improving agent, such as a styrene resin, in a specific content. By introducing the styrene resin into the continuous olefin resin matrix, the foldability of the instant synthetic papers is believed to be improved. Moreover, by the addition of a styrene resin into the continuous olefin resin matrix, it is believed that the synthetic papers of the present invention acquire the appearance of being multi-layered which is commonly associated with conventional pulp writing paper.

The unique and surprising writeable, printable and paper-like properties associated with the synthetic papers of the present invention are amazingly accomplished without having to resort to expensive and complex mechanical, chemical and electrical processes as done by the industry heretofore. Accordingly, when following the teachings of the instant invention, manufacturers of paper substitutes are no longer required to mechanically stretch the synthetic papers formed with olefin resins to generate mechanically produced microvoids for imparting writeability and printability thereto, since the paper substitutes of the instant invention can be formulated with a continuous olefin resin matrix which includes an effective amount of a particulate filler having pre-existing microvoids inherently formed therein for providing microvoids at or on the surfaces thereof for imparting writeability and printability thereto.

The novel paper substitutes of this invention are especially suitable for use as writing paper, envelopes, in-mold labels, bags, cards, cups, poster paper, tape, packaging paper, overwraps, greeting cards, labels and the like. When the novel synthetic papers of the instant invention are used as in-mold labels for plastic articles, such as plastic bottles, produced by blow-molding techniques, they uniquely afford cost saving and convenient advantages by permitting the plastic articles with such in-mold labels positioned thereon to be recycled. When the novel synthetic papers of the present invention are used as writing paper, envelopes, greeting cards, labels, tape, overwraps, cards, poster paper, packaging paper, cups, bags, etc., they also afford cost savings and convenient advantages to the manufacturers thereof due to, among other things, the simplified technique for manufacturing such synthetic papers. Moreover, since it is not necessary to subject the novel synthetic papers to solvent, chemical or electrical treatment, they will not generally split, crack, deform or lose their desired properties over time.

The present invention therefore now makes it possible to produce a synthetic paper which surprisingly exhibits good paper-like qualities including good receptivity and retentivity for common writing materials, such as ink, pencil lead, paint and the like, without resorting to expensive and elaborate mechanical, chemical and electrical manufacturing techniques required heretofore. It should therefore now be apparent to those versed in this field that certain of the problems attendant with synthetic papers provided hitherto are overcome in a relatively simple, yet unobvious manner by the present invention.

The above features and advantages of the instant invention will be better understood with reference to the accompanying figures, detailed description and example. It should also be understood that the particular paper substitutes illustrating the instant invention are exemplary only and not to be regarded as limitations of the invention.

BRIEF DESCRIPTION OF THE FIGS.

Reference is now made to the accompanying FIGS. in which certain FIGS. illustrate embodiments of the present invention from which its novel features and advantages will be apparent:

Figure 5:
Figure 6:
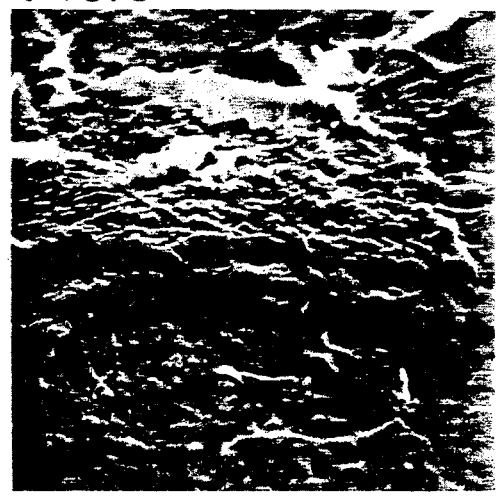

FIG. 5 is an exploded view magnified by 5,000× of a portion of a surface of an unstretched plastic film formed with calcium carbonate particles devoid of microvoids, which illustrates such a particle on or at the surface thereof; and FIG. 6 is an exploded view magnified by 5,000× of a portion of a cross-section of an unstretched plastic film formed with calcium carbonate particles devoid of microvoids which are dispersed therethroughout.

DETAILED DESCRIPTION

By way of illustrating and providing a more complete appreciation of the present invention and many of the attendant advantages thereof, the following detailed description is given concerning the novel unstretched synthetic papers and methods of producing same.

Figure 1:
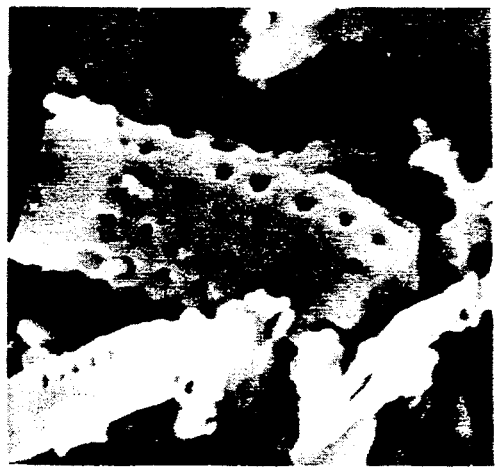
FIG. 1 is an exploded view magnified by 5,000× of diatamaceous earth particulate filler particles having pre-existing microvoids inherent thereto which can be utilized in the instant invention.
Figure 4:
FIG. 4 is an exploded view magnified by 5,000× of calcium carbonate particles which appear to be devoid of any pre-existing microvoids.
Figure 2:
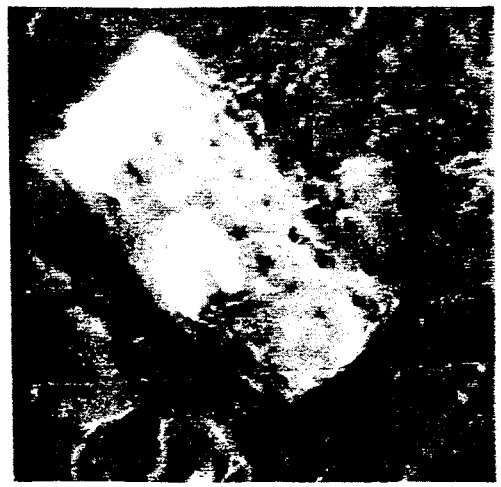
FIG. 2 is an exploded view magnified by 5,000× of a portion of a surface of an unstretched synthetic paper-like film produced with diatamaceous earth particulate filler particles having pre-existing microvoids inherent thereto in accordance with the instant invention, which illustrates such a particle on or at the surface thereof for imparting writeability and printability thereto.
Figure 3:
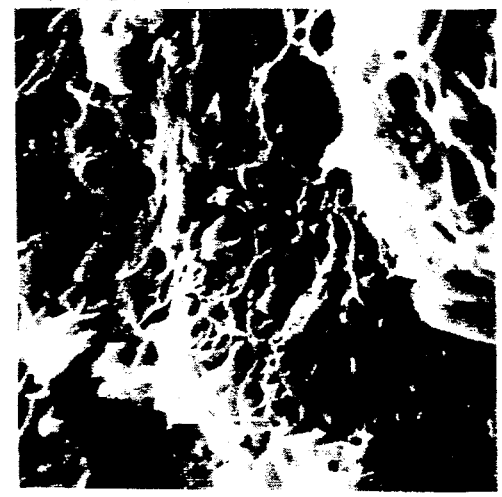
FIG. 3 is an exploded view magnified by 5,000× of a portion of a cross-section of an unstretched synthetic paper-like film produced in accordance with the instant invention illustrating diatamaceous earth particulate filler particles having pre-existing microvoids inherent thereto which are dispersed therethroughout, as indicated by a sponge-like texture.

The synthetic paper-like products of the instant invention can be produced by a process comprising melt mixing and forming a homogeneous blend comprising an olefin resin in an amount by weight of about 60% to about 90% and a particulate filler having pre-existing microvoids provided therewith in an amount by weight of about 10% to about 40%, and thereafter shaping the melt mixed homogeneous blend into a film or sheet having a continuous matrix. The microvoid particulate filler is dispersed somewhat uniformly but randomly throughout the continuous matrix such that microvoids are provided in communication with the surface for imparting writeability and printability thereto, as illustrated in FIGS. 1–3. Once produced, the film or sheet can be written or printed on, adhesive coated on one side thereof if desired, and die cut. By the phrases "particulate filler having microvoids" or "microvoid particulate filler," they are used in a broad sense herein and refer to any organic or inorganic substance in the form of particles having microvoids for imparting porosity, such that when the particulate filler is blended into the continuous olefin resin matrix, the particulate filler provides microvoids at, on and/or near the surfaces of the unstretched synthetic films or sheets produced to impart writeability and printability thereto, as depicted in FIGS. 1–3. Nevertheless, it should be understood that the terms "particulate filler having microvoids" or "microvoid particulate filler" are also intended to include any organic or inorganic substance which has the ability to impart effective porosity to at least the surface of an unstretched synthetic film or sheet produced in accordance with the teachings of the instant invention to impart acceptable writeability and printability thereto. The terms "particulate filler having microvoids" or "microvoid particulate filler" are not meant, however, to include those fillers which are incapable of imparting porosity to the surface of the films or sheets produced for imparting good writeability or printability thereto, such as particulate fillers virtually devoid of microvoids and formed of nonporous materials, like calcium carbonate, as illustrated by FIGS. 4–6.

By the term "microvoid" as used herein in the above-phrases, it too is used in a broad sense herein and refers to voids smaller than about 20 microns, but nevertheless of any sufficient size for receiving and retaining writing materials for imparting writeability to the surfaces of the synthetic papers of the present invention. See for example the particulate filler depicted in FIG. 1, as compared to the particles illustrated in FIG. 4.

Examples of microvoid particulate fillers that can be used in the instant invention include diatamaceous earths, volcanic ash, silica gels, styrogels, porous glass beads and the like. Examples of diatamaceous earths that may be dispersed within the continuous olefin resin matrix of the synthetic paper-like films of the instant invention include Eagle-Picher's Celaton MW-21, MW-25 and MW-27, Witco's Micro-Ken 801, and John Manville's Celite 212. An example of volcanic ash that may be utilized with the present invention is Grefco Inc.'s Perlites, material, such as FF16 and FF26. Regardless of which microvoid particulate filler is selected, it should be understood that the microvoid particulate filler should have the properties defined above so that when dispersed throughout the continuous olefin resin matrix of the paper-like product in an effective amount, an effective amount of microvoids are in communication with the surface to impart writeability and printability thereto. The amount of microvoid particulate filler to be used will of course be influenced by the size of the particles, the type of olefin resin selected, the amount of other additives used, the molding conditions, the thickness of the film produced and the like, but generally, such particulate fillers are used in an amount of between about 5% and about 30% by weight. Typically, the microvoid particulate fillers have a particle size in the range of between about 2 microns and about 20 microns, and preferably between about 5 microns and about 10 microns.

The olefin resins that can be used in the instant invention are, for example, high density polyethylene, medium density polyethylene, low density polyethylene, ethylene-vinylacetate copolymers, ethylene-propylene copolymers, polypropylene, polybutene-1 and the like. Such olefin resins may be used individually, or in combination. High density polyethylene is especially preferred and examples thereof include those available through Dow Chemicals, HDPE (10062) and Quantum Chemical HDPE (6206).

According to the present invention, it may also be desirable to add other additive resins to the above-mentioned composition. For instance, when a styrene resin or the like is used as the additive resin, good printability, stiffness as well as foldability is imparted to the synthetic papers. It is believed, however, that good foldability typically is not obtained with a styrene resin content of less than about 5% by weight. On the other hand, it is believed that the styrene resin content should not be greater than about 10% by weight in order to prevent substantial lowering of the tear strength, impact strength and tensile strength of the synthetic papers produced therewith. Examples of styrene resins that can be used in this invention include polystyrene, poly-alpha-methylstyrene, styrene-butadiene copolymers having a high styrene content, high impact polystyrene, acrylonitrile-butadiene-styrene copolymer, acrylonitrile-styrene copolymer, styrene-methylenemethacryate copolymer and the like. When copolymers of styrene with other monomers are selected, it is believed that the styrene content should be at least about 50%. An example of a polystyrene resin that can be used in the instant invention may be obtained from Dow Chemicals under the trademark Styron 420 or from Phillip under polystyrene resin.

In this invention, an inorganic filler may be further added to the mixture of the olefin resin and microvoid particulate filler with or without the above-mentioned additive resins, such as a styrene resin. As to the inorganic filler, talc, kaolin, zeolite, mica powder, asbestos powder, calcium carbonate, magnesium carbonate, calcium sulfate, clay, silica powder, aluminum magnesium sulfate, barium sulfate, zinc sulfite, titanium oxide, zinc oxide and the like may be used. When an inorganic filler is selected, it is preferred that such inorganic filler have an average particle size of less than about 10 microns, and more preferably less than about 5 microns. The inorganic fillers can be used in amounts of between about 0 and about 20% by weight, and preferably between about 5% to about 10% by weight. Among such inorganic fillers, calcium carbonate is particularly preferred and may be obtained from ECCA Calcium Products, Inc., Supercoat, Georgia Marble, Gamma Sphere $CaCO_3$, and Pfizer, multi-flex MM coated and uncoated $CaCO_3$. While calcium carbonate is a preferred inorganic filler, it should be appreciated that it is not to be used as a substitute for the microvoid particulate filler to impart writeability to the surfaces of the paper-like films of the instant invention since calcium carbonate particles are generally devoid of the necessary microvoids, as illustrated by FIGS. 1-6.

For the purpose of improving moldability of the composition and physical properties of the resultant film and increasing the amount of the particulate and/or inorganic filler in the composition, it is believed that natural rubber or synthetic rubber such as polyurethane rubber, styrene-butadiene rubber, acrylonitrile-butadiene rubber, poly-butadiene rubber, polypropyleneoxide rubber and the like may be added to the continuous olefin resin matrix. Such rubber, however, should not be used in an amount which exceeds the total amount of the olefin resin, any additive resin, such as a styrene resin, and/or the particulate filler. If an additive resin already containing rubber, such as high impact polystyrene, is used, this should be considered when adding other rubber containing materials to the composition.

In the present invention, the synthetic papers may be pigmented to impart desirable aesthetic qualities by for example incorporating into the continuous matrix a colored or white pigment, such as titanium oxide. In addition to being pigmented, it is also possible to further add other various additives to the synthetic papers such as a plasticizer, a stabilizer or other similar agents. Further, for promoting the dispersion of the particulate filler and/or inorganic filler, it may be advantageous to use a surfactant, a dispersing agent or other similar agent. It is also possible to add an ultraviolet ray absorbent or an anti-oxidant so as to improve weatherability of the resultant structure, or to add an anti-static agent. These types of additives would be employed in their customary amounts well known to those versed in this field.

The above-mentioned specific compositions are typically melt mixed sufficiently by means of, for example, a mixing roll, a Banbury mixer, an extruder or the like, and then molded into a film or sheet by means of, for example, a calendar roll, an extruder or the like. Generally, the molding is performed in a manner such that the resultant film or sheet product has a continuous olefin resin matrix with a thickness of between about 1 mil and about 10 mils, and preferably between about 4 mils and about 6 mils.

When a product of the present invention is produced as described above, a structure having the appearance of multi-layers may result due to the fact that when an additive resin is blended into the composition, the resultant product has a tendency of sometimes undergoing separation of the olefin resin from the additive resin, such as a styrene resin, to create the appearance of a multi-layered-like structure which is characteristic of conventional pulp paper. As a result, a paper-like product produced in accordance with the instant invention has the characteristics of being stiff and foldable, and it can be torn. In addition, when a styrene resin is utilized, it is believed that various layers may be peeled from the paper-like products produced in accordance with the instant invention which is further characteristic of conventional pulp paper.

The synthetic paper-like structures of the instant invention can be formed into films or sheets which can be printed, adhesive coated, and die cut into plastic labels or used as in-mold plastic labels for plastic articles, such as bottles, produced via a blow-molding operation or the like. The use of the paper-like products of the instant invention as plastic in-mold labels has many advantages over paper labels. In particular, when the paper-like products of the instant invention are used as plastic in-mold labels, the labels and plastic articles to which the in-mold labels are applied can be easily and advantageously recycled. When utilizing the synthetic paper-like products of the present invention as in-mold labels, they may be applied to plastic bottles in accordance with techniques well known to those versed in the art, such as those described in U.S. Pat. Nos. 4,708,630, 3,108,850, and 3,417,175, which are incorporated herein by reference in their entireties. In addition, the synthetic paper-like products of the instant invention have many other useful applications including writing paper, envelopes, tape, greeting cards, overwrap, bags, packaging paper, labels, cards, poster paper, cups, etc.

Examples of a paper substitute of the present invention will now be further illustrated with reference to the following examples.

EXAMPLE I

SYNTHETIC PAPER

An unstretched synthetic paper-like product free of mechanically produced microvoids and formed with a continuous olefin resin matrix which includes an effective amount of a particulate filler having pre-existing microvoids, wherein the microvoid particulate filler is somewhat uniformly dispersed throughout the continuous olefin resin matrix for providing non-mechanically produced microvoids in communication with a surface of the paper-like product for imparting writeability and printability thereto, is produced by mixing one of the following two compositions into a homogeneous blend and shaping the blend into pellet form:

|  | By Weight |
|---|---|
| Composition I | |
| High density polyethylene | About 62% |
| Polystyrene | About 7% |
| Calcium carbonate | About 7% |
| Diatamaceous earth | About 19% |
| Titanium oxide | About 5% |
| Composition II | |
| High density polyethylene | About 71% |
| Polystyrene | About 8% |
| Calcium carbonate | About 5% |
| Diatamaceous earth | About 10% |
| Titanium oxide | About 6% |

Upon mixing one of the above recited Compositions to form a homogeneous blend and shaping the blend into a pellet, the pellet is extruded with for example a conventional single screw extruder into a film or sheet having a continuous olefin resin matrix and a thickness of between about 1 mil and about 10 mils, and preferably about 4 mils to about 6 mils. The resulting unstretched synthetic paper-like product exhibits excellent receptivity and retentivity for common writing materials, such as ink, pencil lead, paint and the like, when it is written or printed on the surface thereof. Surface primers may be applied prior to printing to enhance printing. Protective coatings, such as a lacquer, may also be applied after printing to protect the printed surface from moisture, abrasion, etc. In addition, the unstretched synthetic paper-like product exhibits excellent paper-like and foldability characteristics. These properties are surprisingly accomplished without stretching the extruded synthetic paper-like product.

EXAMPLE II

IN-MOLD LABELS

Using Composition I as recited in Example I, the homogeneous blend is extruded through a die to produce a flat sheet or film having a controlled thickness, typically of about 4 mils. In addition to extrusion, the film can be blown or cast, embossed, matte or flat. In a further operation, a suitable heat activatable adhesive is applied or coated onto one side of the film. The adhesive is such that the adhesion properties are activated in a subsequent blow molding operation during application of the in-mold label to a plastic container. On the opposite side of the film, a decorative pattern is applied thereto, normally by printing, to provide a label design and information required for the finished article, such as a bottle or container. The printing can be done by various methods including rotogravure, offset, flexographic and the like. Surface primers may be coated onto the film prior to printing. Protective coatings, such as a lacquer, may be applied on top of the printing to protect the printing from moisture, abrasion, etc. The film is then die cut, used as label stock in an in-mold label application. In the case of offset printing, the adhesively coated film may be first cut into sheets, then printed, and finally die cut into individual labels. For rotogravure printing, the film is sheet and die cut after printing. After die cutting, the film is then in the proper shape and size for the final label.

The finished labels are applied to the bottle or container during the in-mold labeling operation. This process involves directly applying a label inside of the mold during the blow molding operation which forms the bottle or container. The molten plastic extruded into the mold contacts the label strategically positioned within the mold and in particular the adhesive side thereof as well as the mold wall, at which point the molten plastic solidifies to form the finished article. The heat from the molten plastic activates the adhesive on the film and forms the bond between the bottle or container and the film.

The in-mold labels of this Example are believe to perform equally as well as equivalent paper-based products, with the added advantages of: 1.) the in-mold labels may match the thermal characteristics, i.e., melting temperature, shrinkage, heat capacity, etc., of the blow molded plastic bottles or containers; and 2.) scrap molded bottles or containers formed with the in-mold labels of this Example may be easily recycled due to the fact that the in-mold labels are formed with materials similar in nature to those utilized to form the bottles or containers. Moreover, because the in-mold labels of this Example are formed with materials similar in nature to those utilized to form bottles or containers, the conformity problem due to shrinkage normally associated with paper labels is substantially, if not totally, eliminated. As a result, the overall product performance during use of the bottles or containers is believed to be greatly enhanced by use of the in-mold labels of this invention.

EXAMPLE III

PRESSURE SENSITIVE LABELS

The Composition II as recited in Example I is used in this Example III to formulate pressure sensitive labels. A homogeneous blend of Composition II is extruded into a uniform film having a controlled thickness, generally of about 4 mils. This film is believed to have excellent printing characteristics similar to the films of Example II, but has enhanced properties in terms of an increase in tear strength and toughness and a decrease in stiffness. In a further step, the produced film is coated with a pressure sensitive adhesive laminated to a release liner and die cut to produce pressure sensitive labels.

The pressure sensitive adhesive is believed to retain its adhesive nature at room temperature and, as such, the release liner such as silicone coated paper can be applied to the film before rewinding it into rolls. Normally, these rolls are slit down to the finished widths of the pressure sensitive labels.

The slit rolls are then normally strategically printed thereon with a decorative pattern and/or product information. The printing can be done by various printing methods suitable for roll stock, such as flexographic, rotogravure, and others. Surface primers may be applied prior to printing to enhance printing. Protective coatings, such as a lacquer, may be applied after printing to protect the printed surface from moisture, abrasion, etc.

The printed, adhesive-coated film can then be die cut into the finished shape of the pressure sensitive labels. This is typically down with a rotary or single die cutting unit. The cut can be made through the single layer of film without cutting through the release paper. To achieve this, the film usually has a balance of properties, mainly between tensile and elongation properties. This is generally achieved through the materials used in the formulation. After die cutting, the film is again rewound into rolls and stored until further processing.

The pressure-sensitive film labels can then be transferred to bottles or containers or the like by peeling or removing the labels from the release liners and, with pressure, properly applying the labels to the appropriate bottles, containers or the like. In modern, high speed filling lines, this is normally done in line by unwinding the film rolls, moving the films in line near the bottles, containers or the like, peeling the labels from the release liners, and transferring the peeled labels to the bottles, containers or the like. All of the above can be done mechanically in line. Such pressure sensitive labels should have the proper balance of stiffness and flexural strength to perform adequately in this operation. It is believed that the combination of good printability and the balance of stiffness and tear strength make the films of this Example especially suitable for pressure sensitive label applications for, inter alia, plastic bottles, containers and the like.

EXAMPLE IV

ENVELOPES AND BAGS

Composition I as recited in Example I is formed into a homogeneous blend and extruded through a die to produce a flat sheet of film of controlled thickness for formulating a plastic, printable envelope. For this application, a coextruded film is generally needed to provide different properties on each side of the film. Typically, one side of the film is the printable side made with the printable formulations identified by this invention and in particular Composition I as recited in Example I. The other layer provides toughness and good heat sealing properties and could be composed of a material such as a linear low density polyethylene having a melt index of about 1.0. A coextruded film of this type can be produced by any of several coextrusion methods well known in the industry.

One such coextrusion method includes feeding the different materials into two different extruders and then combining the flows from the extruders at the die in such a manner as to form two distinct uniform layers. More particularly, a homogenous blend of Composition I recited in Example I is coextruded into a two layer film, with the second layer consisting of the 1.0 melt index linear low density polyethylene and a color concentrate, such as a white concentrate. This coextruded film has a total thickness of about 3.0 mils. The coextruded film can then be slit into a suitable width and wound into a roll. The printable side of the film is then printed by methods such as flexographic, rotogravure, etc., and then rewound into a roll. Surface primers may be applied prior to printing to enhance printing. Protective coatings, such as a lacquer, may also be applied after printing to protect the printed surface from moisture, abrasion, etc. The printed film is then converted into an envelope or bag. This is normally done by unwinding the roll of printed film, folding the film across its width, heat sealing or gluing the edge and cutting and heat sealing the envelope to a suitable length. Normally, adhesives are applied to seal the envelope in use. Other features, such as perforation for tearing, clear exterior pouches, and release tapes may be added. The finished product then has a printed outside layer with decorative patterns and/or information, with an inner layer of tough, tamper resistant film with high opacity to conceal the contents of the envelopes. Due to the porous nature of the outer printable layer, this surface gives good adhesion to typical postage stamps, which normal plastic films available heretofore do not.

This unique combination of properties to form the composite films of this Example is believed to be especially useful in applications such as shipping envelopes, overnight mail envelopes and bags. It should be understood that the properties of these composite films, such as surface properties as coefficient of friction, texture and stiffness, can be independently varied for each layer as desired.

EXAMPLE V

ANTI-STATIC PRINTABLE FILMS

To form an anti-static printable film, an anti-static agent, such as Hexcel 273C or Hexcel 273E Fine Chemicals Co., 205 Main Street, Lodi, N.J. 07644 or Armostat 310 or Armostat 410, Armak Chemicals Co., 300 South Wacker Drive, Chicago, Ill. 30306, can be added to the Composition I as recited in Example I in convertibles of 0.1 to about 0.2% by weight of the Composition I. It is believed that the anti-stat will migrate to the surface of the film to produce a surface that will readily dissipate a static charge, or in other terms, prevent a static build up and discharge at the film's surface. This anti-static property is believed to be beneficial in various operations such as printing, sheet cutting, label application, etc., where static build up can cause problems. In addition, it is believed that certain fillers, such as diatamaceous earth, control the migration of the anti-stat material to the surface of the film in such a manner that the printing characteristics or adhesion properties of the film surface are not compromised.

Thusly, it can be seen from the Examples, that the unstretched synthetic paper products produced in accordance with the instant invention are effective substitutes for conventional pulp paper and the like. As a result, the unstretched synthetic paper products of the instant invention provide simple, but unobvious means heretofore unavailable for providing paper substitutes.

The present invention may, of course, be carried out in other specific ways than those herein set forth without departing from the spirit and essential characteristics of the instant invention. The present embodiments are, therefore, to be considered in all respects as illustrative and not restrictive, and any changes coming within the meaning and equivalency range of the appended claims are to be embraced therein.

Having described our invention, we claim:

1. A synthetic paper substantially free of mechanically produced microvoids for writing and printing thereon, said synthetic paper consisting essentially of a continuous high density polyethylene matrix having uniformly dispersed therein an effective amount of filler particles having microvoids, said dispersed particles being exposed at a surface of said paper, said filler particles having microvoids at said surface for receiving and retaining ink or similar imaging material in the microvoids thereby imparting writeability and printability to said synthetic paper.

2. A synthetic paper as recited in claim 1 wherein said particulate filler is a diatamaceous earth.

3. A synthetic paper as recited in claim 1 wherein said particulate filler is selected from a group consisting of volcanic ash, silica gels, styrogels and porous glass beads.

4. A synthetic paper as recited in claim 1 wherein said polyethylene is present in said continuous matrix in an amount of about 60% to about 90% by weight and said particulate filler is present in said continuous matrix in an amount of about 10% to about 40% by weight.

5. A synthetic paper as recited in claim 1, said synthetic paper being an in-mold label for a plastic structure, said in-mold label having indicia thereon.

6. A synthetic paper as recited in claim 1 wherein said synthetic paper is in the form selected from the group consisting of a writing paper, envelope, card, tape, overwrap, bag, cup, greeting card, label, packaging paper and poster paper.

7. A synthetic paper as recited in claim 1 wherein said continuous polyethylene matrix further includes a styrene resin.

8. A synthetic paper as recited in claim 1 wherein said continuous polyethylene matrix further includes an inorganic filler.

9. A synthetic paper as recited in claim 8 wherein said inorganic filler is present in an amount of up to about 20% by weight.

10. A synthetic paper as recited in claim 1 wherein said synthetic paper has a thickness in the range of between about 1 mil to about 10 mils.

11. A synthetic paper as recited in claim 1 wherein said synthetic paper has a thickness in the range of between about 2 mils and about 5 mils.

12. A synthetic paper as recited in claim 1 wherein said continuous polyethylene matrix further includes an anti-static agent.

13. A synthetic paper substantially free of mechanically produced microvoids for writing and printing thereon, said synthetic paper being formed with a continuous matrix consisting essentially of

| | |
|---|---|
| high density polyethylene, | about 60-75% |
| polystyrene | about 5-10% |
| calcium carbonate, | about 5-10% |
| diatamaceous earth, and | about 10-20%, and |
| titanium oxide | about 0-5% | wherein said diatamaceous earth having microvoids and being dispersed throughout the continuous matrix to expose said microvoids at a surface of said synthetic paper, said microvoids exposed at said surface for receiving and retaining ink or similar imaging material in the microvoids for imparting writeability and printability to said synthetic paper.

14. A synthetic paper as recited in claim 13, said synthetic paper being an in-mold label for a plastic article, said in-mold label having indicia thereon.

15. A synthetic paper as recited in claim 13, said synthetic paper being selected from a group consisting of a writing paper, envelope, label, card, greeting card, tape, bag, cup, overwrap, poster paper and packaging paper.

16. A synthetic paper as recited in claim 13, said continuous matrix comprising

| | |
|---|---|
| high density polyethylene | about 62%, |
| polystyrene | about 7%, |
| calcium carbonate | about 7%, |
| diatamaceous earth | about 19%, and |
| titanium oxide | about 5%. |

17. A synthetic paper as recited in claim 16, said continuous matrix further including an anti-static agent.

18. A synthetic paper as recited in claim 13, said continuous matrix comprising

| | |
|---|---|
| high density polyethylene | about 71%, |
| polystyrene | about 8%, |
| calcium carbonate | about 5%, |
| diatamaceous earth | about 10%, and |
| titanium oxide | about 6%. |

19. A synthetic paper as recited in claim 18, said continuous matrix further including an anti-static agent.

20. A synthetic paper as recited in claim 13, said continuous matrix further including an anti-static agent.

* * * * *